United States Patent [11] 3,627,854

[72] Inventor Lacey E. Scoggins
 Bartlesville, Okla.
[21] Appl. No. 862,476
[22] Filed Dec. 14, 1971
[45] Patented Dec. 14, 1971
[73] Assignee Phillips Petroleum Company

[54] HEAT STABILIZED POLY(VINYLFLUORIDE) WITH A POLY(VINYLPYRIDINE)
 5 Claims, No Drawings
[52] U.S. Cl....................................... 260/884, 260/30.2, 260/30.4 R, 260/895
[51] Int. Cl........................................ C08f 29/22
[50] Field of Search............................ 260/895, 884

[56] References Cited
 UNITED STATES PATENTS
2,853,465 9/1958 Werner .................... 260/895
3,253,057 5/1966 Landler et al................. 260/884
 FOREIGN PATENTS
1,077,373 3/1960 Germany......................

Primary Examiner—Samuel H. Bleck
Attorney—Young and Quigg

ABSTRACT: Poly(vinylfluoride) is heat stabilized by addition thereto of a poly(vinylpyridine), e.g., poly(4-vinylpyridine) poly(2-methyl-5-vinylpyridine). From about 0.5 to 20 weight percent, now preferably 1 to 3 percent, approximately of the stabilizer is added to the poly(vinylfluoride) to protect it against thermal decomposition. Though poly(vinylfluoride) homopolymer decomposes rapidly in about 1 to 7 minutes at 260°C. and cannot be molded without use of a latent solvent, with the poly(vinylpyridine), decomposition does not occur at this temperature over a 30-minute period. This allows the polymer to be molded.

HEAT STABILIZED POLY(VINYLFLUORIDE) WITH A POLY(VINYLPYRIDINE)

HEAT STABILIZED POLY(VINYLFLUORIDE)

This invention relates to the heat stabilization of a poly(vinylfluoride). In one of its aspects the invention relates to the use of a poly(vinylpyridine) in a minor amount based on the weight of the poly(vinylfluoride) incorporated therewith to guard the same against thermal decomposition. In another of its aspects the invention relates to the production of a poly(vinylfluoride) composition which can be molded without thermal decomposition taking place.

In one of its concepts the invention provides a heat stabilized poly(vinylfluroide). In another of its concepts the invention provides a poly(vinylfluoride) composition containing a heat stabilizer rendering the poly(vinylfluoride) moldable. In a further concept of the invention it provides a composition comprising essentially a poly(vinylfluoride) and a poly(vinylpyridine). In one of its embodiments the invention comprises a composition comprising a poly(vinylfluoride) and a poly(4-vinylpyridine). In a still further concept of the invention it provides a composition comprising a poly(vinylfluoride) and poly(2-methyl-5-vinylpyridine). In a still further concept of the invention it provides a heat stable product formed by producing poly(vinylpyridine) in situ with poly(vinylfluoride).

Heretofore poly(vinylfluoride) per se has not been fabricated by conventional plastic fabrication techniques, for example, compression molding, extrusion, and the like, because it has been decomposed by the heat necessary for successful operation following these techniques. Thus, in the prior art processes, poly(vinylfluoride) has been mixed with a plasticizing latent solvent such as N-methylpyrrolidone or gamma-butyrolactone, etc. It has been fabricated at lower temperatures which plasticization with these materials allowed and subsequently washed free of the materials. Such techniques are not wholly satisfactory because of the need for expensive solvents such as gamma-butyrolactone or N-methylpyrrolidone.

I have now found what I believe to be a concrete advance over the art in that the stabilized poly(vinylfluoride)-polymer blends of the instant invention can be heated to temperatures which are sufficient for compression molding, extrusion, and the like for a time sufficient to accomplish the molding and this without thermal degradation. Accordingly, it appears that the instant invention solves a real problem in the art.

This is particularly so and it is considered that poly(vinylfluoride) finds wide use, largely as coatings, which are highly resistant to weathering for exterior sidings and the like which have a useful life of 30 years or more.

It is an object of this invention to prepare a heat stabilized poly(vinylfluoride). It is another object of this invention to prepare a composition comprising poly(vinylfluoride) and a heat stabilizing agent therefor. It is a further object of this invention to provide a composition comprising poly(vinylfluoride) and a heat stabilizer therefor which renders the poly(vinylfluoride) heat moldable as by compression molding, extrusion, and the like.

It is a still further object of this invention to provide a method for stabilizing poly(vinylfluoride) against decomposition by heat by incorporating thereinto a polymer which will stabilize the same against heat decomposition.

Other aspects, concepts and objects of the invention are apparent from a study of this disclosure and the appended claims.

According to the present invention a poly(vinylfluoride) is stabilized against decomposition by heat by incorporating thereinto a minor amount of a poly(vinylpyridine).

The poly(vinylpyridine) can be blended into or together with the poly(vinylfluoride). Also, in lieu of completely forming the product by blending the poly(vinylpyridine) can be formed in situ with the poly(vinylfluoride) as by forming onto the latter a polymer block of the former.

The usual additives known in the art to be added to polymers as here discussed can be incorporated to form a part of the product of the invention. The amount of poly(vinylpyridine) incorporated into the poly(vinylfluroride) can be determined in each instance by routine testing and will be an amount which will yield at least to an extent the stabilization herein described. Ordinarily, from about 0.5 to about 20 weight percent, now preferably 1 to 3 percent, of the composited polymers will be used.

Although it is evident from a consideration of this disclosure and the examples that generally a poly(vinylpyridine) will act as a heat stabilizer to stabilize the poly(vinylfluroide) against decomposition by heat as during molding, the stabilizers now particularly preferred are poly(4-vinylpyridine) and poly(2-methyl-5-vinylpyridine).

Some nonlimiting examples of other poly(vinylpyridines) which can be employed include:
poly(3-vinylpyridine),
poly(2-vinylpyridine),
poly(2-butyl-5-vinylpyridine),
poly(2-butyl-6-vinylpyridine),
poly(2,4-diethyl-5-vinylpyridine),
poly(2-methyl-3-propyl-4-vinylpyridine),
poly(2,3,4,5,-tetramethyl-6-vinylpyridine) and the like.

Poly(vinylpyridines) prepared from mixtures of substituted and/or unsubstituted vinylpyridines can also be employed. Generically, any poly(vinylpyridine) is now preferably employed which is synthesized from one or more vinylpyridines selected from the generic group represented by:

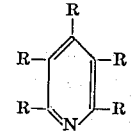

wherein one and only one R is a vinyl group; wherein the other Rs are H or alkyl having in the range of from one to four carbon atoms per R group; and wherein the total carbon atoms in all nonvinyl R groups does not exceed four.

EXAMPLE I

One hundred grams vinyl fluoride, 0.18 grams sodium sulfite, and 600 ml. of deareated, distilled water were initially charged to a stirred reactor. There was then added 0.25 grams ammonium persulfate. The temperature during the run was approximately 50° to 54° C. and the pressure was largely at about 900 p.s.i.g. Time of reaction was about 95 minutes.

There was obtained a thick emulsion of a polymer which was washed with acetone and filtered. The polymer was dried in the air at about 100° C. to a constant weight of 46.4 g. which was obtained in about 8 hours. This polymer was later tested, and is designated polymer A, a control sample of poly(vinylfluoride).

4-vinylpyridine was polymerized in the presence of poly(vinylfluoride) as before, 100 grams of vinylfluoride, 0.18 grams of sodium sulfite and 600 ml. of deareated, distilled water were charged to a stirred reactor. A total of 0.25 grams of ammonium persulfate was then added. The reactor contents were heated in the range of 56°-66° C. for 55 minutes at pressures in the range of 700–1,400 p.s.i.g. Pressure was then vented to 700 p.s.i.g. and 10 ml. of 4-vinylpyridine was charged to the reactor. Heating at 63° C. was continued for 65 additional minutes. The product was filtered. The polymer was washed with acetone to remove unreacted 4-vinylpyridine and was air dried in an oven at 90° C. for 2 hours. A total of 34.1 g. of dry polymer was recovered. This polymer, having poly(4-vinylpyridine) contained therein, is designated polymer B, and was later tested.

The poly(vinylfluoride) (Polymer A) and the poly(vinylfluoride)-poly(4-vinylpyridine) (Polymer B) were then tested by compression molding by putting 1 g. of the respective polymers in the form of a 1-inch diameter disc in a heated press maintained at 500° F. and 13,000 pounds platen pressure for times as noted. The molded discs were then removed and quenched with water.

It was found that the poly(vinylfluoride) (Polymer A) charred quickly in a matter of about 45 seconds. However, the poly(vinylfluoride)-poly(4f'-vinylpyridine) (Polymer B) exhibited essentially no decomposition after 30 minutes.

EXAMPLE II

Poly(vinylfluoride) was synthesized as follows: A reactor was charged with 600 ml. of deareated, distilled water, 100 g. of vinylfluoride, 3 ml. of methanol, and 0.18 g. of sodium sulfite, a total of 0.25 g. of ammonium persulfate was then added. Temperature ranged from 51° to 56° C. and pressure ranged from 600 to 1,400 p.s.i.g. over a period of 65 minutes. The poly(vinylfluoride) polymer formed was recovered by filtration, was washed with acetone, and was dried in air at 90° C. to constant weight to yield 54.4 g. of poly(vinylfluoride).

Poly(2-methyl-5-vinylpyridine) was synthesized as follows: A reactor was charged with 0.10 g. of azobisisobutyronitrile, 25 g. of water, 25 g. of methanol, and 20 g. of 2-methyl-5-vinylpyridine. The materials were heated at 70° C. for 6 hours. A yield of 16.56 g. of poly(2-methyl-5-vinylpyridine) was recovered having an inherent viscosity in toluene of 0.41 at 30° C.

A blend of poly(vinylfluoride) and poly(2-methyl-5-vinylpyridine) as stabilizer therefor was prepared by grinding thoroughly in a mortar with a pestle until a fine powder was obtained 0.3 g. poly(2-methyl-5-vinylpyridine and 10 g. of poly(vinylfluoride). One gram of the resultant mixture in the form of a 1-inch diameter disc was placed in a heated press maintained at 500° F. and 13,000 pounds platen pressure for 5 minutes.

There was no decomposition as shown by charring and there was only a slight discoloration.

One gram of ground poly(vinylfluoride) prepared above in the form of a 1-inch diameter disc was placed in a heated press maintained at 500° F. and 13,000 pounds platen pressure. Immediate charring was evident.

Nine grams of the ground blend of poly(vinylfluoride) and poly(2-methyl-5-vinylpyridine) prepared above was mixed with 7 grams of gamma-butyrolactone. The paste was then placed on a chrome plated stainless steel plate and heated to 200° C. at 20,000 pounds platen pressure for one minute. The molded polymer blend was removed from the stainless steel plates, placed in a frame, and washed with water to remove the solvent. The washed polymer blend was then dried in an oven at 145° C. for 15 minutes. Properties were as follows:

| Tensile yield | (ASTM D 638) | 6360 p.s.i. |
|---|---|---|
| Elongation | (ASTM D 638) | 19 % |
| Haze | (ASTM D 1,003) | 21.5% |

A total of 6.5 g. of the poly(vinylfluoride) prepared above was mixed with 5 g. of gamma-butyrolactone. The paste was molded, washed, and dried as above. Properties were as follows:

| Tensile yield | (ASTM D 638) | 6110 p.s.i. |
|---|---|---|
| Elongation | (ASTM D 638) | 32 % |
| Haze | (ASTM D 1,003) | 18.6% |

The two preceding runs wherein a blend of poly(vinylfluoride) and poly(2-methyl-5-vinylpyridine) and poly(vinylfluoride) were molded and tested in a conventional manner demonstrate that articles molded of the blends have satisfactory physical properties.

EXAMPLE III 4-vinylpyridine was polymerized in the presence of poly(vinylfluoride). A total of 100 grams of vinylfluoride and 600 ml. of deareated, distilled water were added to a stirred reactor. A total of 0.18 g. sodium sulfite and 0.25 g. of ammonium persulfate were then added. The reactor contents were then heated to temperatures in the range of 50°–54° C. at pressures in the range of 600–1,400 p.s.i.g. for 60 minutes. A total of 6 ml. of 4-vinylpyridine was then added and a temperature of 53° C. was maintained at 1,600 p.si.g. for 124 additional minutes. The pressure was exhausted. The polymer was recovered, washed with acetone, and air dried. A yield of 39.6 g. of dry polymer was obtained.

One gram of the resultant polymer in the form of a 1-inch diameter disc was placed in a heated press maintained at 500° F. and 13,000 pounds platen pressure for 5 minutes. No decomposition was noted.

A portion of the dry polymer was compression molded into a 1/16-inch slab at 500° F. and 15,000 pounds platen pressure for 20 minutes. This slab was found to have the following properties.

| (ASTM D 1505) | Density, g./cc. | 1.3008 |
|---|---|---|
| (ASTM D 790) | Flexural Modulus, p.s.i. × | $10^{-3}$ 268 |
| (ASTM D 638) | Tensile Yield p.s.i. | 4720 |
| (ASTM D 638) | Elongation, % | 14 |
| (ASTM D 2240) | Hardness, Shore D | 78 |

An attempt was made to mold an unstabilized poly(vinylfluoride). Char was formed in 45 seconds.

EXAMPLE IV

A total of 10 g. of the polymer produced in example III was ground to a thick paste in N-methylpyrrolidone wherein about 50 percent of the paste was comprised of polymer. The paste was then placed on a chrome plated stainless steel plate and heated to 200° C. at 22,000–25,000 pounds platen pressure for 2 minutes. The molded polymer was removed from the stainless steel plates, placed in a frame, and washed with water to remove the solvent. The washed polymer was then dried in an oven at 160° C. for 10 minutes.

Properties of this preparation are very similar to poly(vinylfluoride) alone when molded employing this conventional technique of molding with a solvent. Thus, tensile yield (ASTM D 638) was 6,190 p.s.i., elongation (ASTM D 638) was 28 percent, and haze (ASTM D 1,003) was 72 percent.

EXAMPLE V

Weatherometer tests were conducted on materials coated with poly(vinylfluoride) per se and on materials coated with poly(vinylfluoride) blended with poly(4-vinylpyridine). Results were very comparable demonstrating that the desirable weather resistant properties of poly(vinylfluoride) are not deleteriously affected by addition of the poly(vinylpyridine) polymers of the instant invention.

Reasonable variation and modification are possible within the scope of the foregoing disclosure and the appended claims to the invention the essence of which is that a poly(vinylfluoride) has been stabilized with a poly(vinylpyridine) as described.

I claim:

1. A poly(vinylfluoride) stabilized against heat having incorporated therein a minor amount of poly(vinylpyridine).

2. Poly(vinylfluoride) stabilized against heat according to claim 1 having incorporated therein a minor amount of at least one poly(4-vinylpyrididine) and poly(2-methyl-5-vinylpyridine).

3. A poly(vinylfluoride) stabilized against heat according to claim 1 having formed thereon a poly(vinylpyridine) polymer block.

4. A poly(vinylfluoride) stabilized against heat according to claim 1 having incorporated therein at least one poly(vinylpyridine) prepared from one or more vinylpyridines having the formula

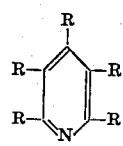

wherein one and only one R is a vinyl group; wherein the other R's are H or alkyl having in the range of from one to four carbon atoms per R group; and wherein the total carbon atoms in all nonvinyl R groups does not exceed four.

5. A method for heat molding poly(vinylfluoride) which comprises stabilizing the same against heat by directly adding thereto a minor amount of a poly(vinylpyridine) without any intermediate treatment with any other compound and then subjecting the admixture to heat molding.

* * * * *